United States Patent [19]
Hsu et al.

[11] Patent Number: 5,304,996
[45] Date of Patent: Apr. 19, 1994

[54] 8B/10B ENCODER PROVIDING ONE OF PAIR OF NONCOMPLEMENTARY, OPPOSITE DISPARITY CODES RESPONSIVE TO RUNNING DISPARITY AND SELECTED COMMANDS

[75] Inventors: Arthur Hsu, San Jose; Yun-Che Wang, Los Altos, both of Calif.

[73] Assignee: Advanced Micro Devices, Inc., Sunnyvale, Calif.

[21] Appl. No.: 839,604

[22] Filed: Feb. 21, 1992

[51] Int. Cl.$^5$ ............................................. H03M 7/00
[52] U.S. Cl. .......................................... 341/95; 341/58
[58] Field of Search ............................. 341/58, 68, 95

[56] References Cited

U.S. PATENT DOCUMENTS

| | | | |
|---|---|---|---|
| 4,486,739 | 12/1984 | Franaszek et al. | 341/59 |
| 4,520,346 | 5/1985 | Shimada | 341/58 |
| 4,677,421 | 6/1987 | Taniyama | 341/58 |
| 4,855,742 | 8/1989 | Verboom | 341/102 |
| 4,975,916 | 12/1990 | Miracle et al. | 371/47.1 |

*Primary Examiner*—Marc S. Hoff
*Attorney, Agent, or Firm*—Mikio Ishimaru; Gerald M. Fisher

[57] ABSTRACT

An 8B/10B encoder which provides an output of one of a pair of opposite disparity non-complementary 8B/10B command code outputs responsive to RD and selected command inputs.

11 Claims, 3 Drawing Sheets

| Command | TX Command Input | TX Command Input 4-Bit Binary | PRD | Encoded NRZ Sub-Block | | ARD |
|---|---|---|---|---|---|---|
| | | $C_3C_2C_1C_0$ | | abcdei | fghi | |
| 0 | K28.0 | 0000 | − | 001111 | 0100 | − |
| 1 | K28.1 | 0001 | − | 001111 | 1001 | + |
| 2 | K28.2 | 0010 | − | 001111 | 0101 | + |
| 3 | K28.3 | 0011 | − | 001111 | 0011 | + |
| 4 | K28.4 | 0100 | − | 001111 | 0010 | − |
| 5 | K28.5 | 0101 | − | 001111 | 1010 | + |
| 6 | K28.6 | 0110 | − | 001111 | 0110 | + |
| 7 | K28.7 | 0111 | − | 001111 | 1000 | − |
| 8 | K23.7 | 1000 | − | 111010 | 1000 | − |
| 9 | K27.7 | 1001 | − | 110110 | 1000 | − |
| 10 | K29.7 | 1010 | − | 101110 | 1000 | − |
| 11 | K30.7 | 1011 | − | 011110 | 1000 | − |
| 12 | Reserved | 1100 | d − | 001111 | 1010 | + |
| 13 | K28.5+ | 1101 | d − | 001111 | 1010 | + |
| 14 | D21.5/4 | 1110 | − | 101010 | 1010 | − |
| 15 | D10.5/4 | 1111 | − | 010101 | 1010 | − |
| 0 | K28.0 | 0000 | + | 110000 | 1011 | + |
| 1 | K28.1 | 0001 | + | 110000 | 0110 | − |
| 2 | K28.2 | 0010 | + | 110000 | 1010 | − |
| 3 | K28.3 | 0011 | + | 110000 | 1100 | − |
| 4 | K28.4 | 0100 | + | 110000 | 1101 | + |
| 5 | K28.5 | 0101 | + | 110000 | 0101 | − |
| 6 | K28.6 | 0110 | + | 110000 | 1001 | − |
| 7 | K28.7 | 0111 | + | 110000 | 0111 | + |
| 8 | K23.7 | 1000 | + | 000101 | 0111 | + |
| 9 | K27.7 | 1001 | + | 001001 | 0111 | + |
| 10 | K29.7 | 1010 | + | 010001 | 0111 | + |
| 11 | K30.7 | 1011 | + | 100001 | 0111 | + |
| 12 | Reserved | 1100 | + | 001111 | 1010 | + |
| 13 | K28.5+ | 1101 | + | 001111 | 1010 | + |
| 14 | D21.5/4 | 1110 | + | 101010 | 0010 | − |
| 15 | D10.5/4 | 1111 | + | 010101 | 0010 | − |

| Command | TX Command Input | TX Command Input 4-Bit Binary $C_3C_2C_1C_0$ | PRD | Encoded NRZ Sub-Block abcdei fghi | ARD |
|---|---|---|---|---|---|
| 0  | K28.0    | 0000 | –   | 001111 0100 | –   |
| 1  | K28.1    | 0001 | –   | 001111 1001 | +   |
| 2  | K28.2    | 0010 | –   | 001111 0101 | +   |
| 3  | K28.3    | 0011 | –   | 001111 0011 | +   |
| 4  | K28.4    | 0100 | –   | 001111 0010 | –   |
| 5  | K28.5    | 0101 | –   | 001111 1010 | +   |
| 6  | K28.6    | 0110 | –   | 001111 0110 | +   |
| 7  | K28.7    | 0111 | –   | 001111 1000 | –   |
| 8  | K23.7    | 1000 | –   | 111010 1000 | –   |
| 9  | K27.7    | 1001 | –   | 110110 1000 | –   |
| 10 | K29.7    | 1010 | –   | 101110 1000 | –   |
| 11 | K30.7    | 1011 | –   | 011110 1000 | –   |
| 12 | Reserved | 1100 | d – | 001111 1010 | +   |
| 13 | K28.5+   | 1101 | d – | 001111 1010 | +   |
| 14 | D21.5/4  | 1110 | –   | 101010 1010 | –   |
| 15 | D10.5/4  | 1111 | –   | 010101 1010 | –   |
| 0  | K28.0    | 0000 | +   | 110000 1011 | +   |
| 1  | K28.1    | 0001 | +   | 110000 0110 | –   |
| 2  | K28.2    | 0010 | +   | 110000 1010 | –   |
| 3  | K28.3    | 0011 | +   | 110000 1100 | –   |
| 4  | K28.4    | 0100 | +   | 110000 1101 | +   |
| 5  | K28.5    | 0101 | +   | 110000 0101 | –   |
| 6  | K28.6    | 0110 | +   | 110000 1001 | –   |
| 7  | K28.7    | 0111 | +   | 110000 0111 | +   |
| 8  | K23.7    | 1000 | +   | 000101 0111 | +   |
| 9  | K27.7    | 1001 | +   | 001001 0111 | +   |
| 10 | K29.7    | 1010 | +   | 010001 0111 | +   |
| 11 | K30.7    | 1011 | +   | 100001 0111 | +   |
| 12 | Reserved | 1100 | +   | 001111 1010 | +   |
| 13 | K28.5+   | 1101 | +   | 001111 1010 | +   |
| 14 | D21.5/4  | 1110 | +   | 101010 0010 | –   |
| 15 | D10.5/4  | 1111 | +   | 010101 0010 | –   |

FIG. 3

8B/10B ENCODER PROVIDING ONE OF PAIR OF NONCOMPLEMENTARY, OPPOSITE DISPARITY CODES RESPONSIVE TO RUNNING DISPARITY AND SELECTED COMMANDS

FIELD OF THE INVENTION

This invention relates to encoders and more particularly to 8B/10B encoders for high speed data transmission.

BACKGROUND OF THE INVENTION

High data rate transmission requires special encodement considerations to provide a high level of confidence that the transmitted data is being accurately reproduced at the receiver. The so called 8B/10B code is one type of encoding for serial data transmission which has become standard after adoption by ANSI X3T9.3 Fibre Channel Working Group. The code and equipment are described by Widmer et al in "A DC-Balanced Partitiones-Block, 8B/10B Transmission Code," *IBM Journal of Research and Development*, Volume 27, 1983, pp. 46–451.

Among other characteristics, the 8B/10B code satisfies the DC balance requirement which means that the coded transmission has a time averaged zero DC level. DC balance simplifies transmitter and receiver design and improves precision of the system. To accomplish this objective the 8B/10B code provides a unique way to encode 8 bit raw data blocks into 10 bit code words where the 10 bit code words are selected to maximize the number of binary data transitions. The high transition rate improves the ability of the receiver to stay locked in synchronism with the transmitter.

An important aspect of the 8B/10B code is the implementation of the concept called "running disparity" (RD). The running disparity is the cumulative sum of the disparity of all previously transmitted data blocks, where the disparity is defined as the difference between the number of ones and zeroes in a fixed size transmission block. The 8B/10B code does not use, as valid code bytes, all the 1024 bytes in the $2^{10}$ space. Only those bytes with a disparity of +2, 0, or −2 are valid.

By limiting the allowable RD during data transmission to −1 or +1, a simple scheme is enabled such that:
a code word with zero disparity can be sent regardless of current RD;
a code word with +2 disparity can be sent only if current RD is −1; and
a code word with −2 disparity can be sent only if current RD is +1.

A related patent application, filed concurrently with the instant application, discloses "Method and Apparatus for Performing Running Disparity," inventor Marc Gleichert, Ser. No. 07/839,602, filing date Feb. 21, 1992, assigned to the same assignee, is incorporated by referenced herein.

The 8B/10B coding of an 8 bit byte of raw data is carried out in two nibbles, a 5 bit nibble and a 3 bit nibble. The 5 bit nibble is encoded to 6 bits and the 3 bit nibble is encoded to 4 bits. The 8B/10B coding is set forth in Table 1 and 2 as given below by Widmer et al.

TABLE 1

5B/6B ENCODING

| NAME | ABCDE | K | D-1 | abcdei | D1 | abcdei ALTERNATE |
|---|---|---|---|---|---|---|
| D.0  | 00000 | 0 | + | 011000 | − | 100111 |
| D.1  | 10000 | 0 | + | 100010 | − | 011101 |
| D.2  | 01000 | 0 | + | 010010 | − | 101101 |
| D.3  | 11000 | 0 | d | 110001 | 0 |        |
| D.4  | 00100 | 0 | + | 001010 | − | 110101 |
| D.5  | 10100 | 0 | d | 101001 | 0 |        |
| D.6  | 01100 | 0 | d | 011001 | 0 |        |
| D.7  | 11100 | 0 | − | 111000 | 0 | 000111 |
| D.8  | 00010 | 0 | + | 000110 | − | 111001 |
| D.9  | 10010 | 0 | d | 100101 | 0 |        |
| D.10 | 01010 | 0 | d | 010101 | 0 |        |
| D.11 | 11010 | 0 | d | 110100 | 0 |        |
| D.12 | 00110 | 0 | d | 001101 | 0 |        |
| D.13 | 10110 | 0 | d | 101100 | 0 |        |
| D.14 | 01110 | 0 | d | 011100 | 0 |        |
| D.15 | 11110 | 0 | + | 101000 | − | 010111 |
| D.16 | 00001 | 0 | − | 011011 | + | 100100 |
| D.17 | 10001 | 0 | d | 100011 | 0 |        |
| D.18 | 01001 | 0 | d | 010011 | 0 |        |
| D.19 | 11001 | 0 | d | 110010 | 0 |        |
| D.20 | 00101 | 0 | d | 001011 | 0 |        |
| D.21 | 10101 | 0 | d | 101010 | 0 |        |
| D.22 | 01101 | 0 | d | 011010 | 0 |        |
| D/K.23 | 01101 | x | − | 111010 | + | 000101 |
| D.24 | 00011 | 0 | + | 001100 | − | 110011 |
| D.25 | 10011 | 0 | d | 100110 | 0 |        |
| D.26 | 01011 | 0 | d | 010110 | 0 |        |
| D/K.27 | 11011 | x | − | 110110 | + | 001001 |
| D.28 | 00111 | 0 | d | 001110 | 0 |        |
| K.28 | 00111 | 1 | − | 001111 | + | 110000 |
| D/K.29 | 00111 | x | − | 101110 | + | 010001 |
| D/K.30 | 01111 | x | − | 011110 | + | 100001 |
| D.31 | 11111 | 0 | − | 101011 | + | 010100 |

TABLE 2

3B/4B ENCODING

| NAME | FGH | K | D-1 | fghj | D1 | fghj ALTERNATE |
|---|---|---|---|---|---|---|
| D/K.x.0 | 000 | x | + | 0100 | − | 1001 |
| D.x.1   | 100 | 0 | d | 1001 | 0 |      |
| D.x.2   | 010 | 0 | d | 0101 | 0 |      |
| D/K.x.3 | 110 | x | − | 1100 | 0 | 0011 |
| D/K.x.4 | 001 | x | + | 0010 | − | 1101 |
| D.x.5   | 101 | 0 | d | 1010 | 0 |      |
| D.x.6   | 011 | 0 | d | 0110 | 0 |      |
| D.x.P7  | 111 | 0 | − | 1110 | + | 0001 |
| D/K.y.A7| 111 | x | − | 0111 | + | 1000 |
| K.28.1  | 100 | 1 | + | 1001 | 0 | 0110 |
| K.28.2  | 010 | 1 | + | 0101 | 0 | 1010 |
| K.28.5  | 101 | 1 | + | 1010 | 0 | 0101 |
| K.28.6  | 011 | 1 | + | 0110 | 0 | 1001 |

Note:
K.x Restricted to K.28
K.y Restricted to K.23, K.27, K.28, K.29, K.30

All the possible 5 bit data values are listed in column "ABCDE" and their corresponding, valid 6 bit 5B/6B codes are listing in the column labeled "abcdei" and in the column labeled "ALTERNATE." If the running disparity has a positive value immediately before the instant that the encoding of the particular raw data is to commence, then, the valid encoded data for that particular byte must be selected from the column of the Table which will not change the RD or will decrease it. From Table 1, since this would correspond to the "+" condition in Column D-1, the only valid code would be in column "abcdei."

The prior art Widmer et al paper describes combinatorial circuits to carry out the above encoding. Accordingly, for codes with disparity +2 and −2, prior 8B/10B encoders provided logic which selected the proper valid code, responsive to the RD value, from the column "abcdei" or from "ALTERNATE." Note that the ALTERNATE code is the complement of the "abcdei" code. Prior art 8B/10B encoders could only provide one code or its complementary codes for any raw data input.

Although the 8B/10B encoders in the prior art perform running disparity computations, they were only capable of providing complement forms of encodement. Since other portions of the transmitters and control systems are occasionally required to issue commands which require knowledge of the running disparity, (RD), it has been required that circuitry outside of the decoder has been necessary to track or perform RD computation. For example, RD tracking or computation has been necessary to send the proper command to the 8B/10B encoder to instruct it to generate the end of frame delimiter in accordance with the ANCI X3T9.3 standard.

Accordingly, there are instances in conjunction with encoding where it would be advantageous for the 8B/10B encoder to provide other functions responsive to RD in addition to selecting the "ALTERNATE" form of a particular code.

SUMMARY OF THE INVENTION

It is an object of this invention to provide an encoder capable of providing a plurality of output codes responsive to both a command code and to the value of RD, which output codes are not complementary.

It is a still further object of this invention to provide an encoder capable of converting more than one input command code to a plurality of non-complement 8B/10B output code.

BRIEF DESCRIPTION OF THE DRAWINGS

FIG. 3 is a truth table for the FIG. 2 embodiment.

DETAILED DESCRIPTION OF THE INVENTION

Figure 1:
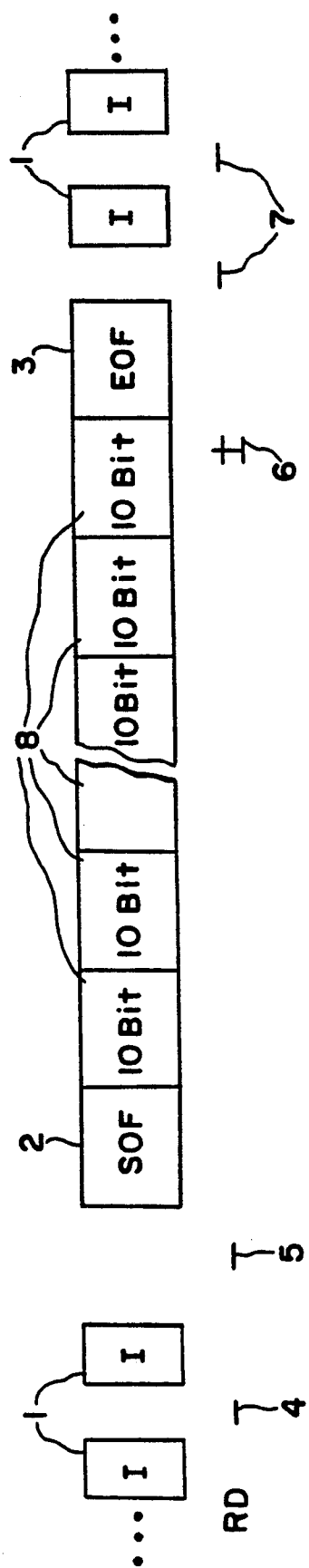
FIG. 1 is a typical data frame or packet schematic.

With reference to FIG. 1, a typical, transmitted serial data frame is illustrated comprising a plurality of 10-bit binary 8B/10B code bytes 8, between a Start of Frame delimiter (SOF), 2, and an End of Frame delimiter (EOF), 3. Between data frames the "primitive" signal called Idle (1), 1, is sent repeatedly. In the Fibre Channel standard, all the delimiters and idles are defined as 4 byte ordered sets which employ the 8B/10B command code called K28.5 as their first byte. The Idle pattern is defined only for the condition where the running disparity is negative at the start, such that running disparity remains negative after each Idle. The Idle pattern ordered set is:

| K28.5 | D21.4 | D21.5 | D21.5 |
|---|---|---|---|
| RD(−)1 | (+) | (−) | (−) |

Since SOF, 2, commences immediately after Idle 1, it also uses only one of the versions of K28.5. However, since the RD at the end of the user data can be either positive or negative, the end of frame (EOF) delimiter must account for and correct for this fact, so that the RD is always negative immediately after EOF is transmitted. This will assure that the proper Idle can be transmitted. The second byte of the EOF packet has been designated as the adjustment byte.

Except for complement forms of a code, 8B/10B encoders do not have the logic to automatically change an output code responsive to a single input command code depending on the RD value. We have provided our encoder with the logic necessary to carry out this function. This simplifies the programming and control necessary to employ the 8B/10B encoder. Earlier systems had to provide the proper command code to the encoder because the encoder was not able to make the end of frame disparity adjustment.

This problem imposed a requirement for computational equipment elsewhere than in the encoder to also provide the high speed logic responsive to the RD value to decide which was the proper code word to send to the encoder to adjust the disparity of the second byte of the EOF delimiter. Since the running disparity flag is already employed in the encoder to support the proper selection of complementing code, our invention has simplified the system design.

Specifically, we have provided a pair of commands, called Command 14 and Command 15 which, depending on value of RD, will be interpreted by our encoder as a request for it to send one of two 10 bit codes which are not complements but which have opposite disparity. Specifically, if the RD is negative, Command 14 will cause transmission of D21.5, and if it is positive, it will cause transmission of D21.4.

Similarly, if the RD is negative, Command 15 will cause D10.5 to be transmitted, and if RD is positive, it will cause D10.4 to be transmitted. Command 14 and Command 15 will be sent to the encoder as the second byte of the EOF delimiter and the encoder will decide which byte will be sent to adjust the RD to be negative at the conclusion of EOF. According to the ANSI standard, there are several different second bytes in the EOF packet. For example, a normal EOF second byte uses D21.5/21.4 but an EOF disconnect/terminate uses a second byte D10.5/D10.4.

Figure 2:
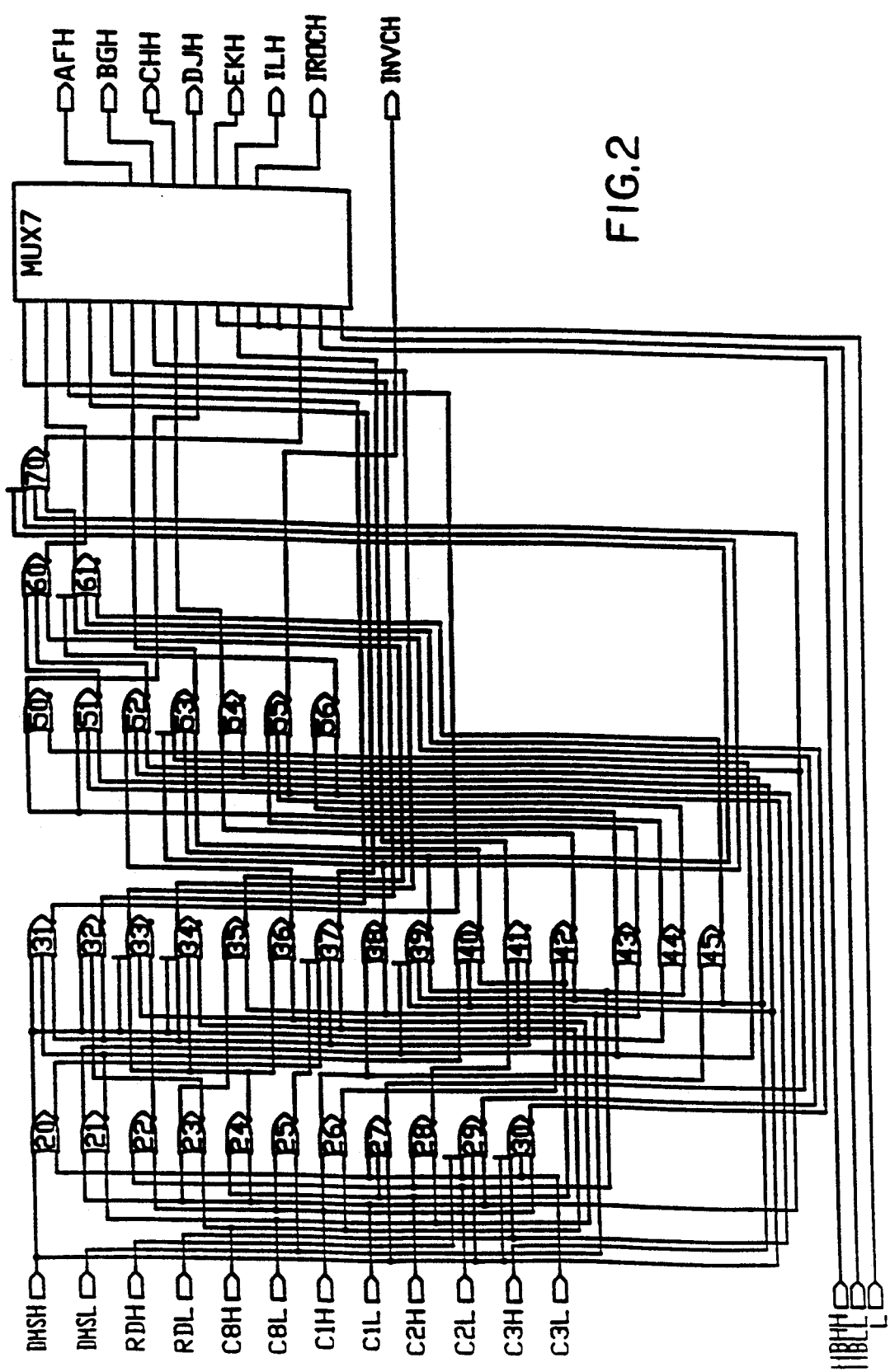
FIG. 2 is a combinational circuit employed to implement our invention.

With reference to FIG. 2, disclosed is the combinatorial logic for the encoder for all the command signals for our 8B/10B transmitter is disclosed. The truth table for the combinatorial logic circuit of FIG. 2 is shown in FIG. 3. The combinatorial circuit of FIG. 3 employs thirty-six (36) interconnected identical OR Gates.

Although FIG. 3 is not in the usual form, it is a truth Table for FIG. 2. Specifically, for all the possible values of $C_3C_2C_1C_0$ in Column 97, combined with the possible values of running disparity before (PRD), Column 96, where − would be a PRD of −1 or a logic 0, and "+" would be PRD of +1 or a logic 1. The output, the encoded NRZ sub block, Column 95 will be the output at the output of MUX7 of FIG. 2. Column labeled ARD, 94, indicates the running disparity after the 10 bit code byte is output. Note that the ARD, Column 94 which coincides with the Command 14 and Command 15, at 98 and 99, is negative for both the cases where PRD, Column 96, is −1 or +1. The notation in Column 93, which coincides to Command 14 and Command 15 is written as "D21.4/5 and D10.5/4" respectively. The notation, for our invention, means that whenever the 4 bit binary command in Column 97 of "1110" is presented to the encoder, and if the PRD is (−), then D21.5 is generated by the encoder. If the PRD is (+), them the D21.4 is sent. The same notation applies to Command 15.

With reference to FIG. 2, the inputs to the combinatorial OR network are shown on the left side of the drawing. From top to bottom, they are defined as follows:

| | |
|---|---|
| DMSH - | 8B/10B Mode select low |
| DMSL - | 8B/10B Mode select high |
| RDH - | Running Disparity high - previous cummulation |
| RDL - | Running Disparity low - previous cummulation |
| COH - | Command Control Least significant bit $C_0$ register high |
| COL - | Command Control Least significant bit $C_0$ register low |
| C1H - | Command Control $C_1$ bit register high |
| C1L - | Command Control $C_1$ bit register low |
| C2H - | Command Control $C_2$ bit register high |
| C2L - | Command Control $C_2$ bit register low |
| C3H - | Command Control $C_3$ bit register high |
| C3L - | Command Control $C_3$ bit register low |
| HBHH - | First nibble register high |
| HBLL - | First nibble register low |
| L - | Logic level low voltage |

The inputs to the combinatorial circuits except for the last one are provided as high and low logic inputs. DMS is required to by presented to the 8B/10B mode to permit it to distinguish from the 10B/12B mode which is not part of this invention. The RDH and RDL are the prior RD inputs of the FIG. 3 truth table, Column 96. The $C_0C_1C_2C_3$ are the 4 bit command words as depicted in Column 97 of the Truth Table. The HB control is the timing control which controls the MUX7 to switch and direct the valid codes to its outputs in two sequential nibbles.

The MUX7 output labels mean:

| | |
|---|---|
| AFH - | a output in period 1; f output in period 2 |
| BGH - | b output in period 1; g output in period 2 |
| CHH - | c output in period 1; h output in period 2 |
| DJH - | d output in period 1; j output in period 2 |
| EKH - | e output in period 1; k output in period 2 |
| ILH - | i output in period 1; l output in period 2 |
| IRDCH - | Inverse Running Disparity for the nibble |
| INVCH - | Complement command to select "ALTERNATE code" |

This invention is not intended to be limited to the specific embodiments described hereinabove, but rather the scope is to be construed in accordance with our claims.

We claim:

1. In an 8B/10B command encoder having a combinatorial logic circuit for converting a set of digital m bit inputs representing command codes into a set of output digital codes having 10 bits, wherein m<10 and where said output codes and complements thereof are valid, if and only if, disparity is +2, 0 or −2, including means to maintain running disparity after the issuance of said output code to be equal to +1 or −1, the improvement comprising,
   means in said combinatorial logic circuit responsive to both (a) the value of running disparity and (b) a particular set of input n digital bits for generating either a first or second output digital code, wherein said first and second output digital codes are not complement forms of one another.

2. The encoder of claim 1 wherein said first and second output digital code have opposite disparity.

3. The encoder of claim 2 wherein said first and second output digital codes are D21.5 and D21.4 respectively and wherein D21.5 is represented in binary code as 1010101010 and D21.4 is represented by binary code as 1010100010.

4. The encoder of claim 2 wherein said first and second output digital codes are D10.5 and D10.4 respectively and wherein D10.5 is represented in binary code as 0101011010 and D10.4 is represented in binary code as 0101010010.

5. The encoder of claim 1 wherein said combinatorial logic includes means to encode more than one particular set of input digital data to one of a plurality of output digital codes.

6. The apparatus of claim 5 including means to encode binary 1111 to said D10.5 code word if said running disparity before said binary 1111 is a negative one or to said D10.4 if said running disparity before said 1111 is a positive one.

7. The encoder of claim 2 wherein said means to encode more than one particular set of input digital data including means to encode 1110 to either D21.5 or D21.4 and means to encode 1111 to either D10.5 or D10.4 where
   D21.5 is 1010101010 and
   D21.4 is 1010100010 and
   D10.5 is 0101011010 and
   D10.4 is 0101010010.

8. The apparatus of claim 7 including means to encode binary 1110 to said D21.5 code word if the said running disparity before said binary 1110 is negative one, or to said D21.4 code if the said running disparity before said 1110 codes is positive one.

9. The method of using the ANSI X3T9.3 Idle packet standard in an 8B/10B encoder wherein each Idle packet commences with the K28.5 special code 011111010 having a positive disparity comprising the steps of,
   adjusting the End of Frame (EOF) packet so that the disparity after the EOF packet is always negative, said step of adjusting the said EOF packet including the step of,
   selecting one of two opposite disparity special command codes as the second byte of said EOF packet based upon whether the value of running disparity was +1 or −1.

10. The method of claim 9 wherein the step of selecting includes, responsive to EOF second byte command code, selecting D21.5 if running disparity is minus or D21.4 if running disparity is plus wherein D21.5 in binary code is 1010101010 and D21.4 is 1010100010.

11. The method of claim 9 wherein the step of selecting includes, responsive to a EOF second byte command code, selecting D10.5 if running disparity is negative or D10.4 if running disparity is positive, wherein D10.5 in binary code is 0101011010 and D10.4 is 0101010010.

* * * * *